United States Patent
Radmanic et al.

[11] Patent Number: 6,030,028
[45] Date of Patent: Feb. 29, 2000

[54] DEVICE FOR ACTUATING A MOTOR VEHICLE TAILGATE

[75] Inventors: Stjepan Radmanic, Mammendorf; Andreas Losert, Herrsching, both of Germany

[73] Assignee: Webasto Karosseriesysteme GmbH, Stockdorf, Germany

[21] Appl. No.: 09/116,603

[22] Filed: Jul. 17, 1998

[30] Foreign Application Priority Data

Jul. 30, 1997 [DE] Germany .............. 197 32 698

[51] Int. Cl.[7] .................. B60J 1/20; B60J 7/22
[52] U.S. Cl. ............. 296/180.5; 296/91; 296/146.16; 296/217
[58] Field of Search ............ 296/91, 180.1, 296/180.3, 180.4, 180.5, 217, 146.16; 49/381, 345; 180/903

[56] References Cited

U.S. PATENT DOCUMENTS

| | | | |
|---|---|---|---|
| 4,854,635 | 8/1989 | Durm et al. | 296/180.5 |
| 5,228,743 | 7/1993 | Regner | 296/223 |
| 5,344,209 | 9/1994 | Regner | 296/223 |

FOREIGN PATENT DOCUMENTS

| | | | |
|---|---|---|---|
| 2614010 | 10/1977 | Germany | 296/91 |
| 1 574 537 | 9/1980 | United Kingdom . | |

*Primary Examiner*—D. Glenn Dayoan
*Assistant Examiner*—Paul Chenevert
*Attorney, Agent, or Firm*—Sixbey, Friedman, Leedom & Ferguson; David S. Safran

[57] ABSTRACT

A device for actuating an angularly displaceable motor vehicle element such as a tailgate element, especially a rear spoiler having an arrangement for displacing it between a retracted rest position and a raised working position and in which a control element (13, 16) interacts with cam track (7) based on linear relative motion between them parallel to the first swivel axis (18) of a motor vehicle element (3) as the element is actuated. To ensure complex motion of the vehicle element (3) in a small installation space for this actuating device, it is provided that the control element is a first pivoted lever (13) which rides on a curved cam track (7) and which has one end pivotally mounted above the cam track (7) on the underside of the vehicle element (3) for rotation around a first pivot axis (18), and an opposite end which is located below the cam track (7) away from the vehicle element (3) for rotation around a first pivoted lever axis (15) that is parallel to the first pivot axis (18), and there is also provided a second pivoted lever (19) which does not engage the cam track (7) and which is pivotally mounted at one end on the underside of the vehicle element (3) for rotation around a second pivot axis (23) that is offset in a lateral direction relative to the first pivot axis (18) and is parallel to it, and which has its opposite end pivotally mounted for rotation around a second pivoted lever axis (20) that is offset in the same lateral direction as the second pivot axis and is parallel to the second pivot axis (15).

15 Claims, 2 Drawing Sheets

DEVICE FOR ACTUATING A MOTOR VEHICLE TAILGATE

BACKGROUND OF THE INVENTION

1. Field of the Invention

The invention relates to a device for actuating a motor vehicle tailgate member, especially a spoiler, between a retracted, rest position and a raised, working position, and having a control element which interacts with a cam track based on linear relative motion parallel to a first pivot axis of the motor vehicle tailgate member as the tailgate member is actuated.

2. Description of Related Art

A device for actuating a wind deflector for a sliding roof of a motor vehicle is known from UK Patent No. 1 574 537. In this known actuating device, the wind deflecting member is pivotally mounted on a transverse edge via a hinge and a cam track is molded onto this edge projecting inwardly. The control element which interacts with the cam track is permanently joined to an actuating cable which is used for linear displacement of the control element which proceeds on the control surface of the cam track and results in the wind deflector being raised and lowered. This relatively simple up and down motion for the wind deflector is suitable for the purpose named in this document, specifically for a wind deflector in the area of a motor vehicle sliding roof. However, it is less suitable for a motor vehicle tailgate which is to execute a more complex motion, such as, for example, a motor vehicle tailgate member in the form of a spoiler.

SUMMARY OF THE INVENTION

A primary object of this invention is to provide an actuating device for a motor vehicle tailgate member which allows a complex pivoting motion to be produced for the motor vehicle tailgate member by simple means.

This object is achieved by the control element being a first pivoted lever which rides on a cam track and which has one end pivotally mounted above a control cam on the bottom of the vehicle tailgate member for rotation about a first pivot axis, and which has its other end pivotally mounted underneath a cam track away from the vehicle tailgate member for rotation around a first pivoted lever axis parallel to the first swivel axis, and by the control element including a second pivoted lever that is disengaged from the control cam and which is pivotally mounted at one end on the bottom of vehicle tailgate member for rotation around a second pivot axis that is laterally offset in a predetermined direction relative to the first pivot axis and is parallel to it, and is pivotally mounted at its other end for rotation around a second pivoted lever axis that is laterally offset in the same direction as the second pivot axis and is parallel to the first pivoted lever axis.

Accordingly, the invention, in other words, devises an actuating device for a motor vehicle tailgate member which has two pivot axes which are offset in the transverse direction and which are, moreover, adjustable in space along paths of varied curvature, so that the motor vehicle tailgate member can be pivotally displaced in a manner which is relatively complex as compared to the prior art and which is matched to the special circumstances in practice.

This pivoting displacement of the motor vehicle tailgate is accomplished by the fact that, in contrast to the prior art, there is no permanent connection between the cam track and the motor vehicle tailgate member, but a connection via a lever, one additional lever or auxiliary lever is provided which is independent of the control curve and which to some extent results in controlled following of the pivoting displacement of the motor vehicle tailgate member caused by the first lever. This construction makes it possible to house the actuating device for the motor vehicle tailgate member in a relatively space-saving manner and enables the motor vehicle tailgate member to be extended and adjusted into an optimally streamlined position which is especially desirable for its use as a spoiler, for example, a rear spoiler.

The relative rotary adjustment between the cam track, which is made preferably as a bridge crank, and the first pivoted lever assigned to it can take place in any manner, specifically, on the one hand, with a stationary first pivoted lever and a linearly shifted bridge crank, and on the other, by a stationary bridge crank and linearly shifted first and second pivoted levers. Based on simpler execution, the version with the linearly shifted cam track or bridge crank is preferable.

These and further objects, features and advantages of the present invention will become apparent from the following description when taken in connection with the accompanying drawings which, for purposes of illustration only, show a single embodiment in accordance with the present invention.

DETAILED DESCRIPTION OF THE PREFERRED EMBODIMENT

Figure 1:
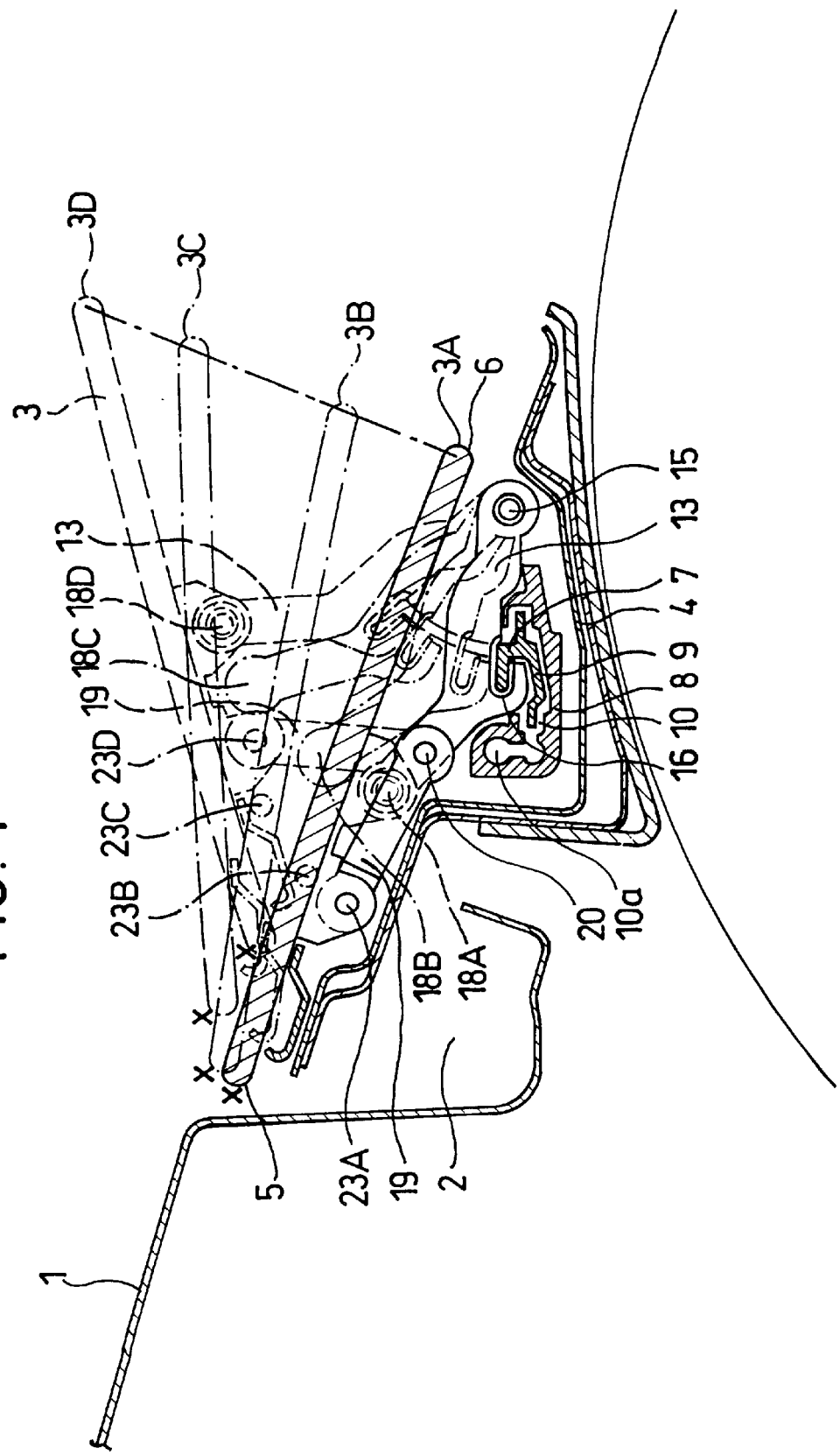
FIG. 1 is a schematic side view of one embodiment of the device according to invention for actuating a motor vehicle tailgate member which is used as a rear spoiler.

In FIG. 1, the obliquely dropping end of the outside roof covering of a motor vehicle is labeled with reference number 1. A depression labeled 2 is closed by the front end of a motor vehicle tailgate member 3 when it is in its rest position. The rest position of the motor vehicle tailgate member 3 is designated 3A, while in its working position, i.e., its fully raised position shown in phantom outline, is designated 3D. Two intermediate positions of the gate are also shown in phantom outline and are designated, respectively, 3B and 3C. In depression 2, is a trough-like sectional frame 4 which consists of several individual sheets and which is used as a mounting frame for attachment of mounting clips 24 (FIG. 2) of the device for actuating motor vehicle tailgate member 3. The structure of this actuating device is explained in particular below using FIG. 2.

As follows from FIG. 1, vehicle tailgate 3 executes a movement which is relatively complex as compared to the prior art. The tailgate is swung not only around a single axis on one transverse edge, but executes a combined pivoting/displacement motion which is characterized in that its edge which is forward in the direction of travel moves along a curved path which rises relatively dramatically proceeding from the rest position, then reaches a peak and falls below the point of origin, as is shown schematically by "x" points shown in FIG. 1 for the different stages of motion. Rear edge 6, in contrast, as shown by a dot-dash straight line, executes essentially a steeply rising movement and traverses a much greater distance than front edge 5. This motion is caused by the control device of the invention which uses two pivot levers, of which one has an end that runs on a curved path, while the other lever, controlled indirectly via vehicle tailgate member 3, executes a simple auxiliary pivoting motion.

Figure 2:
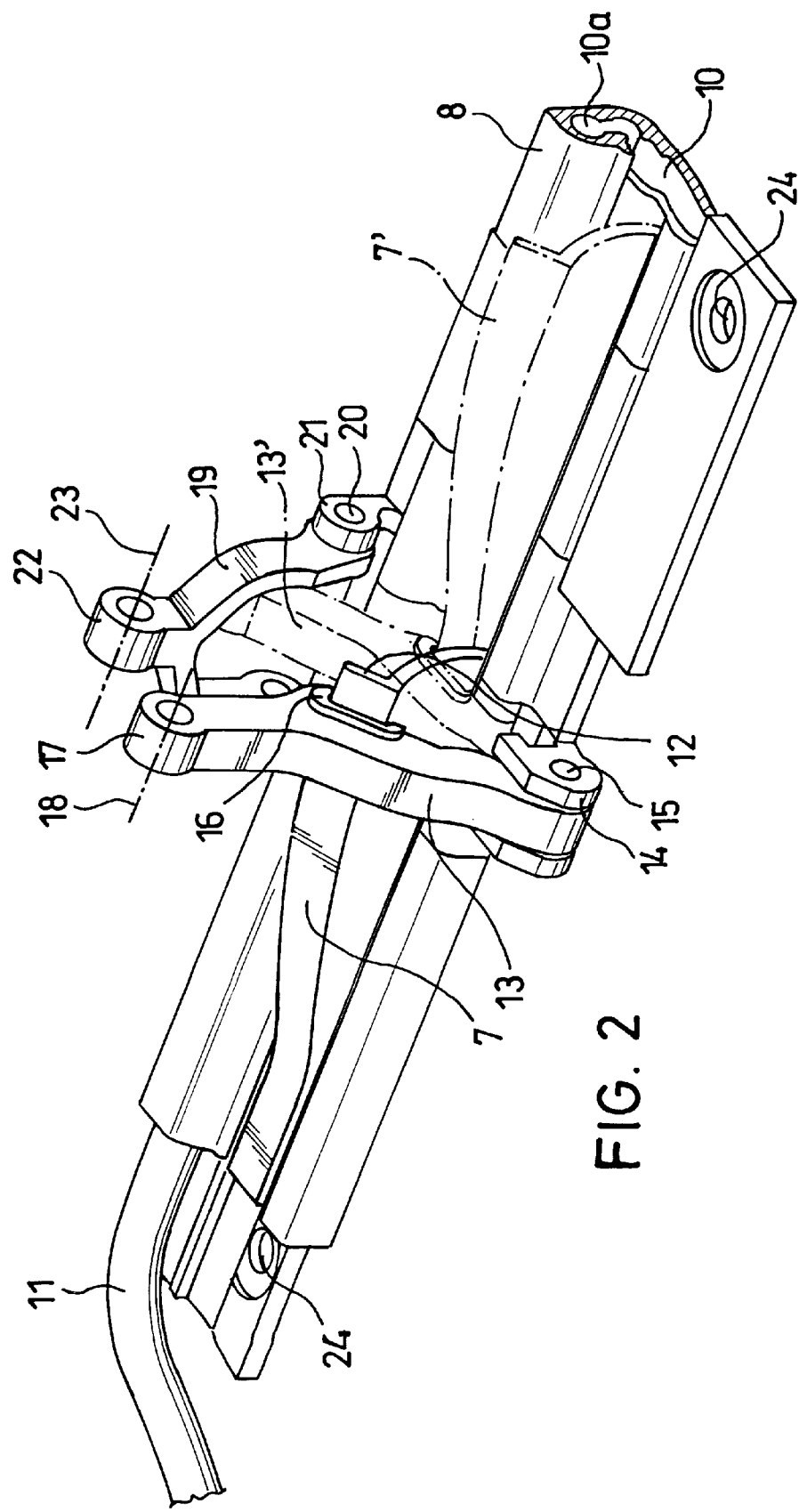
FIG. 2 is a perspective view of the actuating device from FIG. 1 without the motor vehicle being shown.

As shown in FIG. 2, the actuation device of the invention for a vehicle tailgate member 3 has a cam track in the form of a bridge crank 7 which is guided to be linearly adjustable in a hollow section guide rail 8 which runs transversely to the longitudinal axis of the vehicle. Bridge crank 7 and guide rail 8 are shown in FIG. 1 in cross section.

Bridge crank 7, on the lower end, is provided with a guide bridge 9 which runs transversely and which fits in a cavity 10 of the guide rail 8 that has a complementary shape thereto. This cavity 10, moreover, has a segment 10a which is roughly circular in cross section, and in which a drive means is guided for moving the bridge crank 7; for example, the drive means can be a drive cable (not shown) which is routed via a guide tube 11 to one end of the guide rail 8.

Bridge crank 7 has a part that projects over the guide rail 8 which is circularly curved and ends in a bridge 12 which fixes the cam path of the bridge crank and which runs along a curve which allows a pivoting displacement of a control member which is forcibly guided to pivot. In this case, the control member comprises a first pivoted lever 13 which is supported laterally on guide rail 8 and interacts with the control cam or bridge crank 7 so execute a forced pivoting about a first lever pivot axis 15 which is mounted in a pivot bearing 14. First lever pivot axis 15 runs parallel to guide rail 8. At roughly half the height, the first pivoted lever 13 has a claw-like segment 16 which has a complementary shape to that of the bridge 12 of bridge crank 7, so as to extend over the bridge 12 and ride on it.

In FIG. 2, the pivoted lever 13 is shown in two positions, specifically in its working position in which pivoted lever 13 rides on the top end of bridge crank 7, and in a rest position (shown in phantom outline) in which pivoted lever 13 rides on the lower end of bridge crank 7. The pivoted lever 13 is shown in its working position in solid lines and its rest position is designated 13'. The same applies to the bridge crank is shown in its leftmost position, which corresponds to the working position of first pivoted lever 13, in solid lines in FIG. 2, while the rightmost position, which corresponds to the rest position of the pivoted lever 13, is designated 7'.

On the top end of first pivoted lever 13 is another pivot bearing which is also referred to as a first upper pivot bearing 17. The first upper pivot bearing 17 fixes the first pivot axis 18 for the vehicle tailgate member 3. This pivot axis 18 is shown schematically by the dot-dash line in FIG. 2. Otherwise, the upper pivot bearing 17 comprises a hole in the top end of first pivoted lever 13 for receiving a corresponding shaft or journal which is provided on the inner side of vehicle tailgate member 3 and which is permanently joined thereto.

As follows furthermore from FIG. 2, the first pivoted lever axis 15 is located below the guide path of bridge crank 7, while the upper pivoted lever axis, which coincides with first swivel axis 18 of vehicle tailgate 3, comes to rest above bridge crank 7 in all positions of the first pivoted lever 13.

Opposite the first pivoted lever 13 is a second pivoted lever 19 which is pivotally mounted at its bottom end via a second pivoted lever axis 20 in a pivot bearing 21 which is permanently attached to the other side edge of guide rail 8, slightly higher than the pivot bearing 14 for the bottom end of the first pivoted lever 13. The second pivoted lever axis 20 runs parallel to the first pivot axis 18. Second pivoted lever 19 has a fork shape, and thus, another coaxial pivot bearing 21 (shown only in part in FIG. 2) is also provided in the other lower leg for fixing second pivoted lever axis 20.

On the top end of second pivoted lever 19 is an upper pivot bearing 22 for pivoted connection to a corresponding pivot bearing element on the inner side of the vehicle tailgate member 3. This pivot bearing element, viewed in the lengthwise direction of the vehicle, is located at a distance from the pivot bearing 17 for the top end of the first pivoted lever 13. Top pivot bearing 22 fixes a second pivot axis 23 for the vehicle tailgate member 3.

Second pivoted lever 19, in contrast to first pivoted lever 13, does not engage bridge crank 7 and executes its pivoting motion indirectly via the pivoting motion of the vehicle tailgate member 3 that is produced by means of the first pivoted lever 13, as is best illustrated in FIG. 1. This forced guidance of the top end of the second swivel lever 19 is labeled in FIG. 1 at selected points in the path of movement 23A, 23B, 23C, and 23D. The top end of second pivoted lever 19, when vehicle tailgate member 3 is moved between its rest position and its working position essentially traverses a path which is a circular arc. The top end of first pivoted lever 13 likewise traverses a circular arc path curved in the same direction, as is shown by the sequence of points in the path of movement 18A, 18B, 18C, and 18D. These two curved paths are made such that the above explained motion of front edge 5 and rear edge 6 of vehicle tailgate member 3 takes place.

The above described actuating device can be provided as either a single part in the middle of the vehicle tailgate member, or two such parts can be provided on the two sides of the vehicle tailgate.

The arrangement the invention is also suitable overall for the most varied vehicle angularly adjustable parts of motor vehicles not merely tailgate elements such as spoilers. For example, the invention is applicable to lifting roofs, cockpit windshields of motorcycles, engine hoods, trunks, loading hatches, wind deflectors, wind deflection fins and the like. For this reason, even though the invention has been described in detail with respect to only a single embodiment, it is to be understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. An adjustable part of a motor vehicle having means for angular displacement thereof between a retracted rest position and a raised working position, comprising:

a pivotable exterior vehicle element;

a cam track; and a control element which interacts with the cam track in a manner so as to be displaced thereby via linear relative motion therebetween in directions parallel to a first pivot axis of the exterior vehicle element;

wherein the control element comprises a first pivoted lever which rides on the cam track, a first end of the first pivoted lever being pivotally mounted above cam track on an underside of vehicle element for rotation around a first pivot axis and an opposite end of the first pivoted lever being pivotally mounted below the cam track at a distance from the vehicle element for rotation around a first pivoted lever axis which is parallel to said first pivot axis, and a second pivoted lever which disengaged from the cam track and which is pivotally mounted with one end on the underside of the vehicle element for rotation around a second pivot axis that is offset in a lateral direction relative to the first pivot axis and is parallel to it, and an opposite end of the second pivoted lever being pivotally mounted for rotation around a second pivoted lever axis that is laterally offset in the same lateral direction as the second pivot axis and is parallel to the first pivoted lever axis.

2. Device according to claim 1, wherein said pivotable exterior vehicle element is a tailgate element.

3. Device according to claim 2, wherein said tailgate element is a rear spoiler.

4. Device as claimed in claim 1, wherein first edge of the vehicle element is disposed above and opposite second edge of the vehicle element in the working position; and wherein coupling points at which the pivoted levers are mounted on the underside of the vehicle element are located away from said first edge of the vehicle element.

5. Devices as claimed in claim 4, wherein the first pivoted lever is located nearer than the second pivoted lever to said first edge of the vehicle element; and wherein the first pivoted lever is longer than the second pivoted lever.

6. Device as claimed in claim 1, wherein the pivoted lever axes are fixed and the cam track is supported to move linearly in a rail by a linear drive for producing linear relative motion between the cam track and the pivoted levers.

7. Device as claimed in claim 6, wherein the cam track is a bridge crank with bridge edge that is surrounded by the first pivoted lever.

8. Device as claimed in claim 1, wherein the cam track is a bridge crank with a bridge edge that is surrounded by the first pivoted lever.

9. Device as claimed in claim 3, wherein first edge of the vehicle element is disposed above and opposite second edge of the vehicle element in the working position; and wherein coupling points at which the pivoted levers are mounted on the underside of the vehicle element are located away from said first edge of the vehicle element.

10. Device as claimed in claim 9, wherein the first pivoted lever is located nearer than the second pivoted lever to said first edge of vehicle element; and wherein the first pivoted lever is longer than the second pivoted lever.

11. Device as claimed in claim 3, wherein the pivoted lever axes are fixed and the cam track is supported to move linearly in a rail by a linear drive for producing linear relative motion between the cam track and the pivoted levers.

12. Device as claimed in claim 11, wherein the cam track is a bridge crank with bridge edge that is surrounded by the first pivoted lever.

13. Device as claimed in claim 3, wherein the cam track is a bridge crank with a bridge edge that is surrounded by the first pivoted lever.

14. Device as claimed in claim 1, wherein said angular displacement between the retracted rest position and the raised working position is a complex angular motion of the vehicle element in which one edge of the vehicle element follows an arcuate path while an opposite edge of the vehicle element follows a linear path.

15. Device as claimed in claim 1, wherein said cam track is arcuately curved.

* * * * *